Patented July 24, 1928.

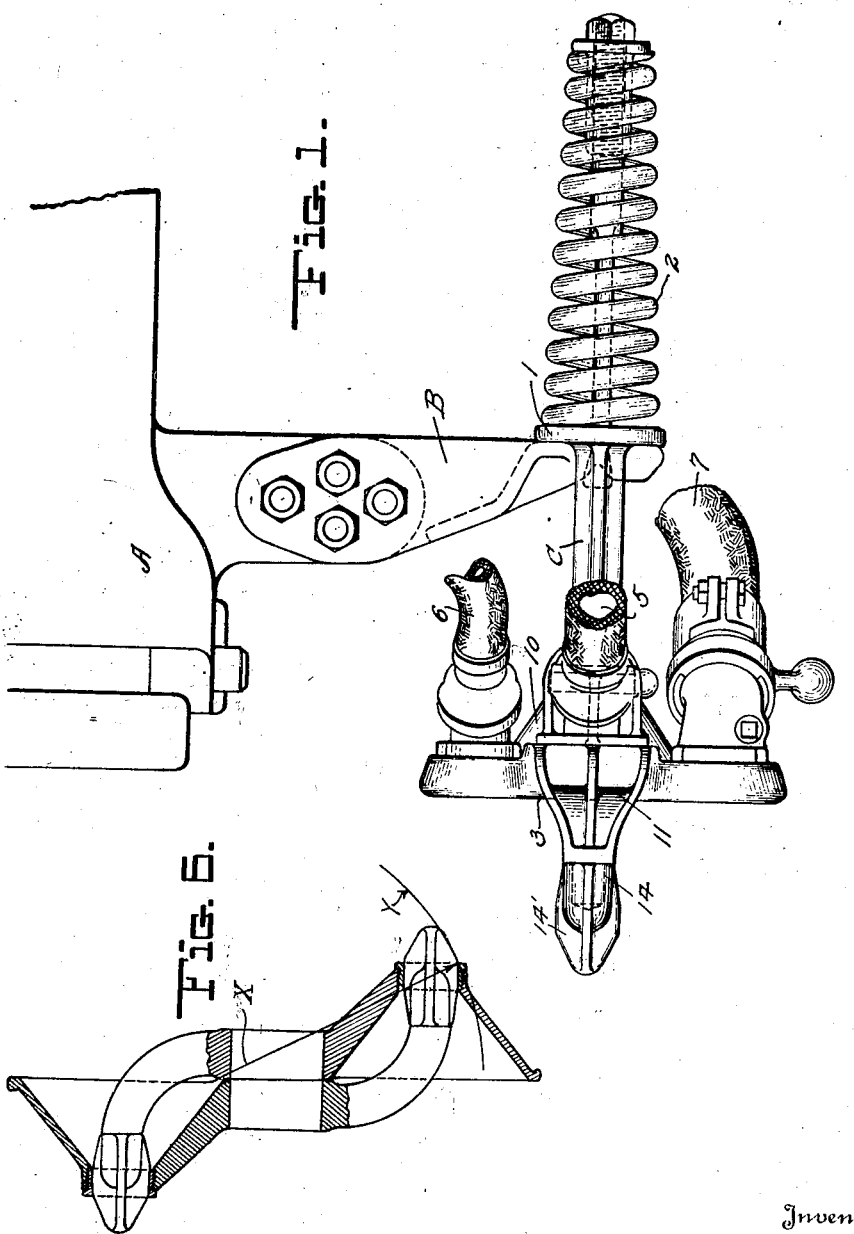

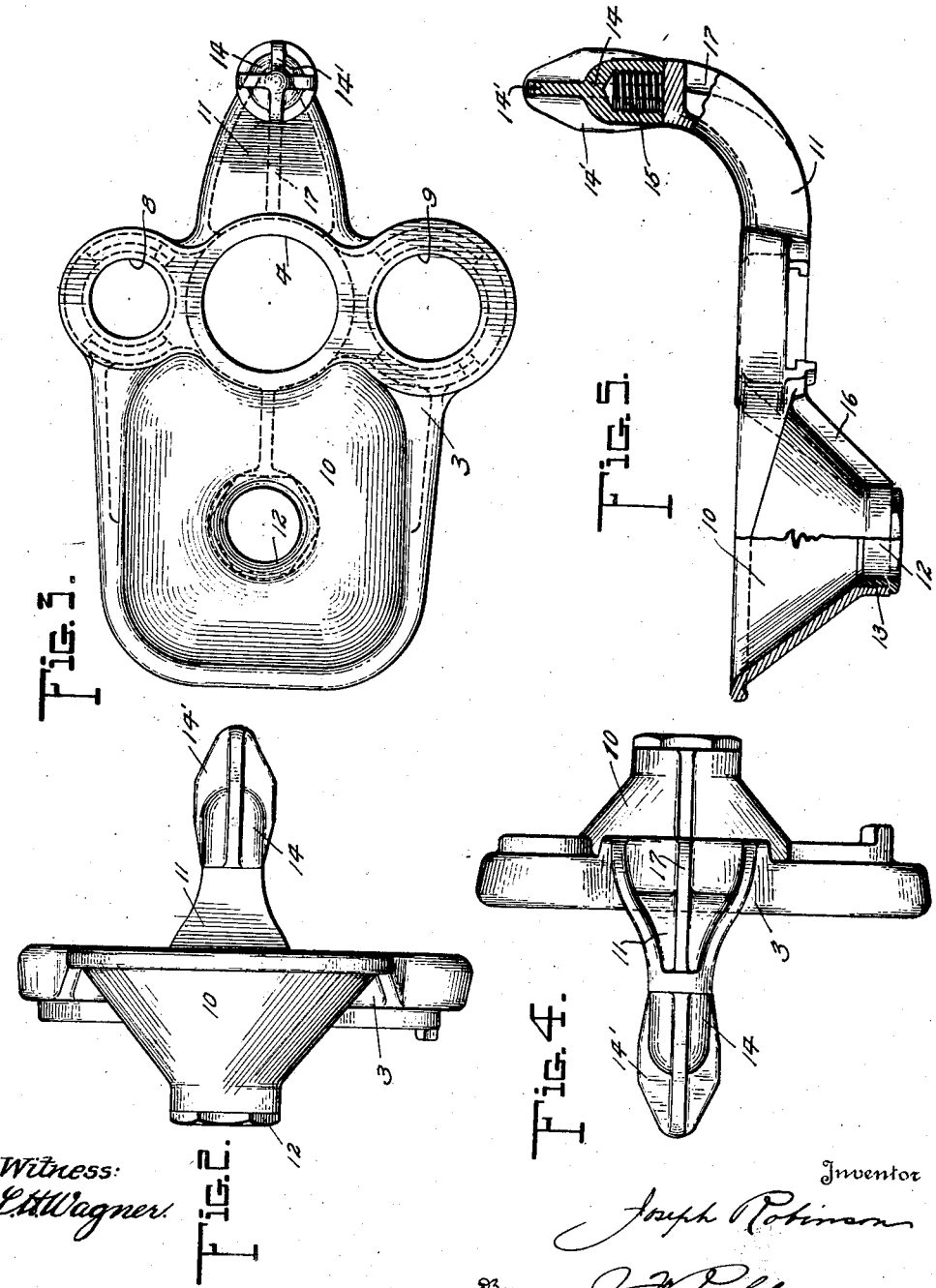

1,677,902

UNITED STATES PATENT OFFICE.

JOSEPH ROBINSON, OF MORRISTOWN, NEW JERSEY.

AUTOMATIC TRAIN-PIPE CONNECTER.

Application filed October 18, 1921. Serial No. 508,583.

The invention hereof involves improvements in what are commonly known as train pipe connecters for railway cars, and especially the class of connecters known as the pin and funnel type.

My long experience in the development and operation of connecters, such as above referred to, and doubtless the experience of others versed in this art, has disclosed that the efficiency of a connecter depends primarily upon the proper aligning of the gaskets of the connecter heads in coupling and the proper maintaining of the gaskets in aligned operative engagement after coupling. In turn, the effectiveness of the gasket alignment necessary to obtain a proper connection of the fluid conduits of the heads depends absolutely upon maintaining predetermined gathering contours or dimensions of the gathering and centering members of the coupling elements or heads themselves. The chief problem involved in the matter of maintenance of the predeterminately established gathering contours for the coupling devices is to compensate for the wear incident to these parts contacting with one another, and operating in contact, in the coupling and uncoupling actions thereof. I have devised special means as hereinafter disclosed more fully, for preventing the wear upon the coupling elements of the connecter by which the efficiency of the connection of the fluid conduits has been interfered with heretofore, after comparatively short usage of the coupler. Additionally, the means which I have provided for this purpose are such as to admit of ready and complete renewal of the engaging or wearing portions of the coupling elements if at any stage after long and continuous use of my connecter there has been such wear upon the contacting gathering surfaces as to change even to the slightest degree the maintenance of the predetermined gathering contour hereinbefore referred to, and by which the efficiency of the alignment of the gaskets of the fluid conduits of the connecter members is reduced even to the slightest degree. The ends to be accomplished as above noted, I have attained through the employment of novel and unique renewable centering means for the pin and funnel members of the connecter, and I believe that the broad idea of use of such means is new in this invention. In so far as I am aware, no means whatever have heretofore been employed for the purpose above noted, reliance being had in the prior art on the use of such heavy complicated and expensive constructions of gathering devices for the connecter, as to preclude the employment of such types of connecters, owing to their commercial impracticability.

Another essential and important desideratum in the construction of connecters of the class herein described, is to overcome the difficulty of coupling failures encountered as an incident to the lodgment and accumulation of foreign substances upon the gathering or inter-guiding elements of the connecter heads and an important feature of my present improvement resides in so designing the pin and funnel members of my connector as to overcome the defective operations encountered from the above cause. In accomplishing this particular result, I utilize a special form of centering head for the pin member of my connecter, which centering head is of an oppositely tapered formation so that I obtain what I may characterize as a "wedge-in" and a "wedge-out" formation. The importance of this particular point of construction is evident when it is understood that under practical conditions of service, foreign substances, such as snow and ice have a tendency not only to interfere with the proper gathering together or inter-locking of the coupling heads of a connecter, but such substances especially in cold weather interfere likewise with the separation or parting of the heads in car uncoupling operations.

Not only is the centering head of the pin member of my connecter peculiarly constructed for the purpose outlined above, but I utilize for this part what I may call a skeleton construction in that it is made up of a series of wings rather than a solid body so that its "wedge-in" and "wedge-out" operations in its centering and uncoupling movements are considerably facilitated, the wing parts of the head having a tendency to cut, and thus force themselves through any gathered snow and ice in the funnel adjacent to the centering socket of the latter. In this connection, I have availed myself of the mechanical advantages incident to the employment of a centering head, the aggregate contacting area of which, for the purposes of its centering operation, is relatively small.

In addition to the primary features of construction already set forth, I have paid especial attention to designing the coupling head of my connecter so that the means by which I maintain the coupling contour are applied to the head in an exceedingly simple way, and correspondingly are removable with great ease. Furthermore, the general form of the entire connecter member has been designed with a view to simplifying the manufacturing problems involved in its making, so that the construction is relatively cheap and economical to manufacture. At the same time, a highly rigid and strong formation of the body of the connecter member is availed of so that the simplification of the construction has in no way sacrificed these necessary things. While in most constructions heretofore proposed, so far as I am aware, dependence has been placed for proper connection of the coupling members, upon relatively large areas of contact between the pin member and funnel member parts, in my present construction I have aimed particularly to avoid this thing. Obviously, where the pin member and funnel member into which it fits, have contacting portions of a relatively large area, the likelihood of interference of foreign matter lodging between said portions, with a complete and proper seating of the parts together is increased in exact proportion to the amount of the contacting area referred to. In consequence, the liability of improper alignment of the gaskets of the fluid conduits to be aligned, is controlled according to the degree of existence or non-existence of this factor of the contacting area, and the efficiency of the connecter depends thereon for the reasons previously set forth.

Again, it is obvious that where relatively large contacting areas between coupling parts are employed, and the efficiency of the joint between the coupling members depends upon such area, as it must, nicety of the fitting of the contacting portions together is necessary, and requires very considerable machining of the work in manufacturing, something which I purposely avoid in the carrying out of my present invention.

Ancillary to the foregoing objects, are other specific and material features of construction designed by me incidental thereto and made clear in the following detailed description, and the accompanying drawings, in the latter of which:

Figure 1 is a side elevation of a train pipe connecter embodying the present invention, the fluid conduits being broken away, and the method of supporting the connecter being clearly illustrated.

Figure 2 is a side elevation of one of the coupling members alone.

Figure 3 is a front view of the same.

Figure 4 is a side elevation looking at the coupling member from the side opposite that illustrated in Figure 2.

Figure 5 is a top plan view, the opposite end portions of the coupling member being broken away and partly shown in section to illustrate clearly the method of detachably connecting the socket element of the funnel member and the pilot or centering head of the pin member.

Figure 6 is a sort of diagrammatic view showing mated coupling members as when coupled, supporting parts and fluid conduits with intermediate couplings being omitted.

Superficially, in general construction, my connecter of this invention resembles to some extent known types, in so far as the use of certain main elements is concerned. Referring to the drawings, Figure 1 shows at A, a car coupler from which depends a supporting bracket B upon which the main parts of my connecter are hung. The bracket B is notched at its lower portion so as to support for sliding and universal movement, the coupling member C which comprises spaced straps or sides engaging the notched part of the bracket B. At its rear end, the coupling member C has an abutment 1 maintained normally engaged with the rear face of the bracket B by a buffer spring 2. The coupling member C embodies a coupling head 3 of what is known as the pin and funnel type, and this head is supported on the coupling member C at the middle port 4 of the head, seen best in Figure 3, and with which port the brake line conduit 5 is connected, the usual signal air, and steam conduits 6 and 7 respectively being adapted to be coupled to the upper and lower ports 8 and 9 respectively of said head. Since my invention resides primarily in the construction of the main coupling head 3, the method of mounting this head upon the coupling member C, and the devices for attaching the conduits 5, 6 and 7 to the head, are not material and are not described in detail for this reason, such features being in whole or in part presented in co-pending applications of mine, or being known to those versed in this art.

Figures 2 to 5 inclusive of the drawings best show my coupling head construction by which I attain the various objects and advantages hereinbefore outlined. The head 3 will be seen to comprise the funnel member 10, the middle or port section having the ports 4, 8 and 9, previously referred to, formed therein, and the pin member 11. The funnel member 2 is designedly of shallow formation and has a somewhat oblong contour in front elevation, tapering rearwardly, as shown most clearly in Figures 2 and 5. At its rear extremity, said funnel member 10 is equipped with a socket element 12, consisting of a sleeve, preferably of steel or hardened metal of a suitable nature. This socket element 12 is screwed into the threaded rear opening of the funnel member 10 as shown at 13, and at its rearmost portion the socket member has a many-sided portion for the application of a wrench or other tool whereby the element may be screwed into the funnel member and removed therefrom. At its front end, the socket element 12 is tapered so as to conform with the internal taper or contour of the funnel member 10. The middle section of the coupling head is, of course, an integral part of the funnel member 10, as well as the pin member 11, and the several ports 4, 8 and 9 are superposed in their formation therein.

The pin member 11 constitutes an offstanding horn or arm of the coupling head, curved forwardly so as to readily enter the funnel member of a mating head, in the well known manner. One distinctive feature of the pin member 11 is the provision at the forward end of the arm or horn thereof of a centering or pilot head 14. The head 14 is peculiarly made in that it comprises a forwardly and rearwardly tapering body consisting of a series of angularly extending wings or flanges 14'. Again, the head 14 is detachably applied to the body of the pin member, being internally threaded so as to screw upon a threaded stem 15 of said body. Furthermore, this head 14 is made of steel or hardened metal, as is the socket member 12, the body of the head 3 being preferably of malleable iron.

The funnel member 10 tapers abruptly and is relatively shallow so as to tend to shed, so to speak, any foreign matter lodging thereon.

In view of the previous statement of my invention, it is evident that in the cooperation of mating coupling heads 3, the wear incident to the coupling and uncoupling operations is received principally upon the socket element 12 and the centering head 14. These are the parts by which I am enabled to maintain a predetermined gathering contour or dimension for my connecter. The efficiency of the joint between coupling heads, secured largely by the proper engagement of the mating gaskets of the fluid conduits, depends upon the final centering action incident to the entering of the centering heads of mating coupling heads into the socket elements of such heads. The funnel member 10 so far as its body is concerned, has largely a guiding function to bring the centering head to the socket element 12 so wear on the funnel member 10 is not material but any wear at the socket element 12, and upon the head 14, if appreciable, necessarily must interfere with the maintenance of the gathering contour of the coupling devices. For this reason, I concentrate in my coupling head at the parts where it is material to prevent wear, or where wear takes place as a result of long use, and must therefore be eliminated, the hardened operating or bearing surfaces which are constituted by the parts 12 and 14. The capability of these surfaces to resist wear needs no further elucidation in view of the foregoing description, and the readiness with which they may be renewed should the time come that this may be necessary after continuous and extremely long usage, is also self-evident.

It will be clear that in entering and passing out of its mating socket member 12, the head 14 possesses the "wedge-in" and "wedge-out" action hereinbefore referred to and likewise, a minimum contacting area is provided between the parts 14 and 12 of mating heads, owing to the winged, ribbed or flanged formation of the heads 14. Nevertheless, there is a complete effective bearing contact supplied by the head 14 in its cooperation with the circular zone of the bearing surface of the member 12. This latter feature is something which is necessary and contemplated according to my invention, for I have in mind that the area of contact or bearing between each head 14 and each socket member 12, of mating heads 3, shall be ample and sufficient to resist any tendency of such mating heads 3 to rock one upon the other. In illustration of this point, Figure 6 may be referred to. The arrow X upon this figure leads from an edge of the face of the port 4, and said edge might be said to constitute the fulcrum point upon which mated coupling heads would tend to rock, as when rounding a right hand curve, to the wall of the socket member 12 against which a mating centering head 14 contacts. The curved line Y shows the arc which the head 14 would have to describe if relative rocking of mated heads were permitted. As it is impossible, by reason of the bearing relation of the parts 14 and 12 of mated heads, for the said rocking action to take place, the manner in which these parts cooperate to prevent such rocking will be clear. In like manner, this action takes place as regards possible rocking movements of mating heads with the top or bottom parts of the heads as fulcrum points.

The ease with which the opposing heads 14 will enter opposing socket members 12 and force themselves through any gathered snow or ice in the funnels 10, and work similarly in the event of withdrawing or separating action, on account of the rearward tapering of the heads 14, is especially advantageous, and failures owing to improper cooperation of pin members and funnel members as regards these particular phases of action, are obviated by my invention.

In general construction, my coupling head is made very light, relatively speaking, the metal of the construction being distributed so as to afford a maximum of rigidity notwithstanding the lightness aforesaid. In this connection, I point out the use of strengthening ribs at 16 for the funnel and at 17 for the pin member 11, the horn or arm of which is of U-shape in cross section, and therefore very strong. In manufacture, the head 3 necessitates the simple threading of the apex portion of the funnel 10 for the socket member 12, and the threading of the stem or stud 15 for the head 14. The ports 4, 8 and 9 are finished from these surfaces by locating the casting in the machine by a suitable jig. The threading operations are simple drill press operations capable of being economically performed. The centering head 14 and the socket member 12 are machined by simple turning and threading operations. The faces of the ports 4, 8 and 9 are somewhat in advance of the funnel member 10 to insure proper contact of such faces of mating heads 3, unprevented by interference from the engagement of cooperating portions of the funnel and pin members. These contacting faces 4, 8 and 9 thus provide central bearing surfaces acting in conjunction with the abutment cooperations of the heads 14 and socket members 12 to prevent rocking of one coupler head relatively to the other. The said faces of the ports 4, 8 and 9 are machined, and my construction of the member 3 permits it to be readily molded, the center port 4, the opening in the funnel member 10 and the hollow portion of the head 14 providing their own cores, and the ports 8 and 9 alone having to be cored in making the heads. In this way I greatly reduce the cost of casting these heads and simplify the construction thereof in important particulars.

It is within the purview of my invention to form the socket element of the funnel member, and the centering head of the pin member integral with said respective parts, and employ some known method of hardening the element and head to create the wear resisting surface for maintaining the gathering contour of the connecter parts.

Having thus described my invention what I claim as new, is:

1. In a train pipe connecter, mating coupling devices, having normally engaging, non-oscillatory, central bearing surfaces, each comprising funnel and pin members at opposite sides of said bearing surfaces, the pin member having a centering head, and the funnel member having a socket element continuing from its body portion and adapted to receive the centering head of a mating pin member, the head and socket element forming the sole bearing of the pin member on the funnel member when coupling members are coupled, and said bearing being sufficiently extended to counteract any tendency of the coupling members to rock upon one another when coupled.

2. In a train pipe connecter, mating coupling devices, each comprising funnel and pin members, the pin member having a centering head of harder metal than its body, and the funnel member having a socket element continuing from its body portion and adapted to receive the centering head of a mating pin member, the head and socket element forming the sole bearing of the pin member on the funnel member when coupling members are coupled, and said bearing being sufficiently extended to counteract any tendency of the coupling members to rock upon one another when coupled, and means removably connecting the head and socket elements to the pin and funnel members respectively.

3. In a train pipe connecter, mating coupling devices, having normally engaging central bearing surfaces, and each comprising funnel and pin members at opposite sides of said bearing surfaces, the pin member having a centering head, and the funnel member having a socket element continuing from its body portion and adapted to receive the centering head of a mating pin member, the head and socket element forming the sole bearing of the pin member on the funnel member when coupling members are coupled, and said bearing being sufficiently extended to counteract any tendency of the coupling members to rock upon one another when coupled, and means removably connecting the head and socket elements to the pin and funnel members respectively, the head and socket elements being of metal harder than that of the body of the coupling member.

4. In a train pipe connecter, mating coupling devices, each comprising funnel and pin members, the pin member having a centering head at its outer end, and the funnel member having a socket element continuing from its body portion and adapted to receive the centering head of a mating pin member, the head and socket element forming the sole bearing of the pin member on the funnel member when coupling members are coupled, and said bearing being sufficiently extended to counteract any tendency of the coupling members to rock upon one another when coupled, and the head being of larger diameter than the body of the pin member.

5. In a train pipe connecter, mating coupling devices, each comprising funnel and pin members, the pin member having a centering head, and the funnel member having a socket element continuing from its body portion and adapted to receive the centering head of a mating pin member, and said head comprising flanges for bearing contact on the opposing socket element, and the head being tapered forwardly and rearwardly.

6. In a train pipe connecter, mating coupling members, each comprising a pin member and a funnel member, the pin member being provided with an oppositely tapering head for cooperation with an opposing funnel member.

7. In a train pipe connecter, mating coupling members, each comprising a pin member and a funnel member, the pin member being provided with an oppositely tapering head for cooperation with an opposing funnel member, and the opposing funnel member having a socket element in which said head engages.

8. In a train pipe connecter, mating coupling members, each comprising a pin member and a funnel member, the pin member being provided with an oppositely tapering head for cooperation with an opposing funnel member, the head being of greater hardness than the body of the coupling member.

9. In a train pipe connecter, mating coupling members, each comprising a pin member and a funnel member, the pin member being provided with an oppositely tapering head for cooperation with an opposing funnel member, the head being of greater hardness than the body of the coupling member, the socket element being likewise of corresponding hardness to that of the head, and the head being adapted to "wedge-in" and "wedge-out" of its mating socket member in coupling and uncoupling operations.

10. In a train pipe connecter, mating coupling devices, each comprising funnel and pin members, the funnel member being provided with a central socket element, and the pin member being formed with a head at its free end portion, said head having a central enlarged portion intermediate its ends adapted to snugly engage the socket element of a mating funnel member whereby the coupling heads when engaged at their respective pin and socket element portions effectively prevent rocking upon one another, the said head being of skeleton formation in that it comprises wings extending laterally from one another.

11. In a train pipe connecter, mating coupling members, each comprising a pin member and a funnel member, the pin member being provided with a detachable pilot head to enter the opposing funnel member, and made of harder substance than the body of the coupling member.

12. In a train pipe connecter, mating coupling members, each comprising a pin member and a funnel member, the pin member being provided with a detachable pilot head, and the funnel member having a detachable socket element in which the head is received.

13. In a train pipe connecter, mating coupling members, each comprising a pin member and a funnel member, the pin member being provided with a detachable pilot head, and the funnel member having a detachable socket element in which the head is received, and both the head and socket element being of a substance harder than the bodies of their respective coupling members.

14. As a new article of manufacture, a connecter head comprising a body of relatively soft metal, including gathering members of the pin and funnel type, the pin member having a centering head of relatively hard metal and the funnel member having a centering socket of relatively hard metal, the centering head and the said socket element being detachably applied to the body.

15. As a new article of manufacture, a connecter head for train pipe connecters, comprising a body having a mid section provided with conduit ports, a funnel member at one side of said mid section, centrally provided with a socket element, a reinforcing rib connecting said funnel member and mid section, a pin member at the side of the mid section opposite that having the funnel member and of U-shape in cross section.

16. As a new article of manufacture, a connecter head for train pipe connecters, comprising a body having a mid section provided with conduit ports, a funnel member at one side of said mid section, centrally provided with a socket element, a reinforcing rib connecting said funnel member and mid section, a pin member at the side of the mid section opposite that having the funnel member and of U-shape in cross section, the body of said head being of relatively soft metal and the socket element being of relatively hard metal, the pin member being equipped with a centering head of relatively hard metal.

JOSEPH ROBINSON.